United States Patent
Prasad

[11] Patent Number: 5,226,932
[45] Date of Patent: Jul. 13, 1993

[54] ENHANCED MEAMBRANE GAS SEPARATIONS

[75] Inventor: Ravi Prasad, East Amherst, N.Y.

[73] Assignee: Praxair Technology, Inc., Danbury, Conn.

[21] Appl. No.: 772,340

[22] Filed: Oct. 7, 1991

[51] Int. Cl.⁵ .................................. B01D 53/22
[52] U.S. Cl. .................................. 55/16; 55/68; 55/158
[58] Field of Search ................... 55/16, 68, 158

[56] References Cited

U.S. PATENT DOCUMENTS

| | | | |
|---|---|---|---|
| 3,144,313 | 8/1964 | Pfefferle | 55/16 |
| 3,256,675 | 6/1966 | Robb | 55/158 X |
| 3,339,341 | 9/1967 | Maxwell et al. | 55/16 |
| 3,455,817 | 7/1969 | Modell | 55/16 X |
| 3,735,558 | 5/1973 | Skarstrom et al. | 55/16 |
| 3,735,559 | 5/1973 | Salemme | 55/16 |
| 4,583,996 | 4/1986 | Sakata et al. | 55/16 |
| 4,687,578 | 8/1987 | Stookey | 55/158 X |
| 4,718,921 | 1/1988 | Makino et al. | 55/16 |
| 4,737,166 | 4/1988 | Matson et al. | 55/158 X |
| 4,783,201 | 11/1988 | Rice et al. | 55/158 X |
| 4,844,719 | 7/1989 | Toyomoto et al. | 55/16 |
| 4,857,081 | 8/1989 | Taylor | 55/16 |
| 4,931,070 | 6/1990 | Prasad | 55/16 |
| 4,934,148 | 6/1990 | Prasad et al. | 55/16 X |
| 4,950,315 | 8/1990 | Gollan | 55/158 |
| 4,955,998 | 9/1990 | Ueda et al. | 55/16 |
| 4,961,759 | 10/1990 | Taylor | 55/16 |
| 4,973,434 | 11/1990 | Sirkar et al. | 55/16 X |
| 4,981,498 | 1/1991 | Bikson et al. | 55/16 |
| 5,002,590 | 3/1991 | Friesen et al. | 55/16 |
| 5,004,482 | 4/1991 | Haas et al. | 55/16 |
| 5,034,025 | 7/1991 | Overmann, III | 55/16 |
| 5,067,971 | 11/1991 | Bikson et al. | 55/16 |
| 5,084,073 | 1/1992 | Prasad | 55/158 X |

FOREIGN PATENT DOCUMENTS 63-111923  5/1988  Japan.

Primary Examiner—Robert Spitzer
Attorney, Agent, or Firm—Alvin H. Fritschler

[57] ABSTRACT

Highly efficient membrane drying and other gas separations are carried out by the use of low vacuum levels on the permeate side of the membrane.

25 Claims, 2 Drawing Sheets

ENHANCED MEAMBRANE GAS SEPARATIONS

BACKGROUND OF THE INVENTION

1. Field of the Invention

The invention relates to the membrane gas separations. More particularly, it relates to membrane dryers using a purge gas to enhance the drying operation.

2. Description of the Prior Art

There are many commercial circumstances in which it is necessary or desirable to remove moisture from a gas stream. Water vapor is a common impurity in many raw or process gases, and it often acts as a contaminant or corrosive agent that must be removed, or reduced in concentration, before the gas can be used. For example, dry air is often required in pneumatic systems, such as the instrument air used in chemical processing plants. Gases that are used for inert atmospheres must also be highly dried, since residual water vapor can be reactive rather than inert. In other instances, contained moisture can condense or freeze, thereby inhibiting the flow of process streams. Effective means for drying gas streams are, therefore, needed in the art.

Many different means have been customarily employed for drying gas streams. In some cases, mere compression of the gas is sufficient to condense the water vapor to liquid, which can be drained away from the gas stream. Likewise, chillers and cryogenic traps can condense and remove the water as a liquid or as solid ice. Condensation methods are very useful for some applications, but they are often inadequate when a very dry gas stream is required.

Adsorption processes are also often employed for gas drying purposes, since many adsorbents have a strong adsorptive affinity for water. Such adsorbents soon become saturated, however, and must be regenerated periodically if the drying process is to operate continuously. In pressure swing adsorption (PSA) processing, the adsorption is carried out at an upper adsorption pressure. Some of the dry product gas is depressurized and used as a countercurrent purge stream to facilitate desorption of water from the adsorbent bed at a lower desorption pressure. This PSA process can produce very dry gas streams, but some of the product gas must necessarily be recycled for such purge gas purposes and discharged from the system as a waste gas.

Membrane permeation is a particularly attractive drying approach, offering certain advantages over other drying means. It is well known that water vapor is very highly permeable in many synthetic polymer membranes. When a moisture-laden gas is passed over such a membrane, the water vapor will tend to penetrate the membrane and pass through it from the feed to the permeate side provided that a sufficient drying force is present to facilitate the permeation of the water vapor through the membrane. For a commercially suitable drying process, the gas to be dried must be exposed to a large surface area of membrane that is very thin so that the diffusion path in the membrane material is very short. A pressure differential must also be maintained across the membrane to provide the drawing force for a suitable permeation action. In addition, a flow pattern must be established that enables the gas stream being processed to be progressively exposed to additional membrane surface so that the remaining moisture in the gas stream can continue to permeate and be removed from the membrane system. Such processes can conveniently be carried out in a permeation module comprising a large number of so-called composite or asymmetric hollow fibers. Such permeation modules are well known in the art and are becoming widely used for an increasingly broad range of commercial gas separation operations.

It has been determined that so-called 3-port permeators have genuine limitations when used for the drying of low-permeability gases. Such 3-port permeations have a feed gas inlet port and separate outlet ports for the permeate and non-permeate portions of the feed gas. Although the water is highly permeable, it can be effectively removed from the low-pressure passages of the membrane only when there is sufficient permeation of other gases. To act as effective dryers, such permeators must operate with a high stage-cut, which means that a considerable amount of the gas being dried must also be permeated, and thus lost as dry gas product. It has been determined that improved drying can be achieved when a 4-port permeator is employed, provided that there is a high degree of radial mixing within the hollow fibers. With the 4-port permeator, a separate dry purge stream is introduced through the fourth port for passage on the permeate side of the hollow fibers, thereby flushing moisture from the low-pressure passages of the fibers. As a result, purge drying is found to be more effective than permeation drying. Even when dry product gas is used for purge purposes, the purge drying process is superior because forcing the permeation of product gas requires a high pressure difference or a large membrane surface area, both of which are unnecessary when a separate purge gas is used.

Prasad, U.S. Pat. No. 4,931,070 describes the use of a 4-port membrane module, operated in a countercurrent flow pattern, as a gas dryer. In particular, this reference relates to the production of nitrogen, wherein feed air is passed through two membrane permeator stages, wherein the bulk of the oxygen in the air is removed from the nitrogen. The residual oxygen impurity is removed by catalytic reaction with hydrogen in a "deoxo" unit. The water generated by this reaction is largely removed by passing the wet nitrogen gas through a cooler and liquid water separator. Nevertheless, a substantial amount of water impurity remains in the thus-processed nitrogen stream. This residual moisture is removed by a membrane dryer, the low pressure passages on the permeate side thereof being purged by air, the dry permeate from the second stage membrane or by dry nitrogen product.

Despite such advantageous drying processes, further improvements are desired in the art to enhance the membrane drying of gases in practical commercial operations. When product gas is used for purging, a certain amount of product gas is, of course, lost in the purge waste stream. When an external source of dry purge is used some undesired contamination of the product stream can occur by back diffusion of some of the non-product components present in the purge gas. These factors create a practical limitation on the ultimate usefullness of the membrane drying methods referred to above.

It is an object of the invention to provide an improved membrane process and system for the separation of gases.

It is another object of the invention to provide a membrane gas separation drying process and system wherein the back diffusion of impurities from an external source of purge gas is minimized.

It is another object of the invention to provide an improved membrane drying process and system wherein the amount of product gas or external purge gas used as purge is minimized.

It is a further object of the invention to provide an enhanced process and system for removing water vapor from high purity nitrogen without recontamination of product nitrogen during drying and with a high degree of product nitrogen recovery.

With these and other objects in mind, the invention is hereafter described in detail, the novel features thereof being particularly pointed out in the appended claims.

SUMMARY OF THE INVENTION

Enhanced gas separation is achieved by passing a feed gas to be separated through a membrane system at a feed pressure at or above atmospheric pressure, while purge gas is passed on the permeate side of the membrane at a purge pressure well below atmospheric pressure. The purge gas, either a small portion of dry product gas or an externally supplied dry gas, is caused to pass in countercurrent flow to the flow of the feed gas.

BRIEF DESCRIPTION OF THE DRAWINGS

The invention is hereinafter further described with reference to the accompanying drawings in which.

DETAILED DESCRIPTION OF THE INVENTION

Figure 1:
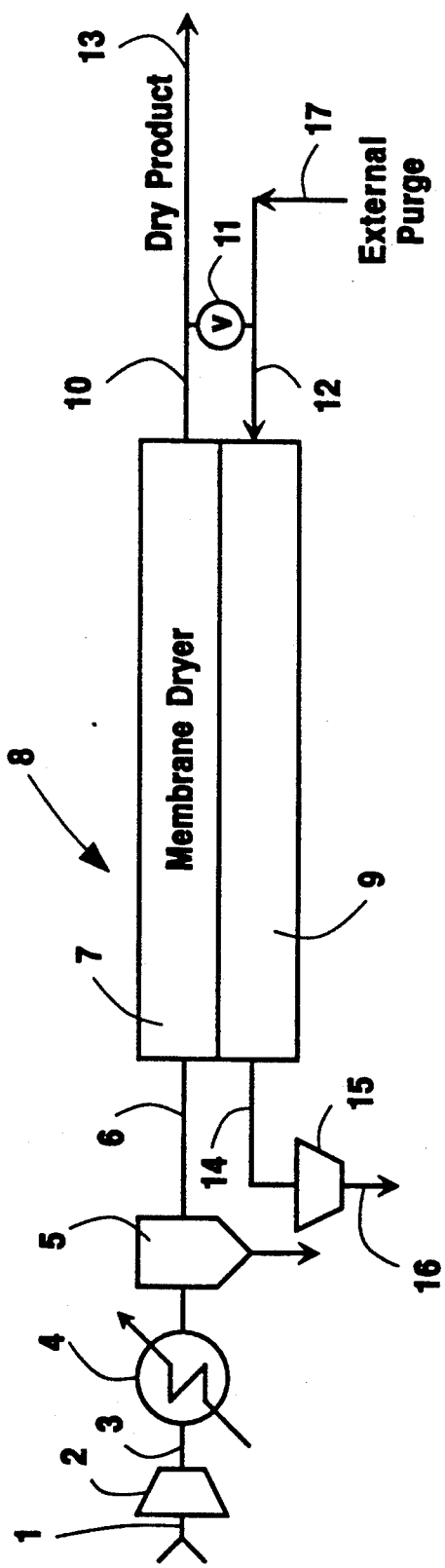
FIG. 1 is a schematic flow diagram of an embodiment of the invention utilizing a small portion of dry product gas as purge gas.

The objects of the invention are accomplished by effectively utilizing the driving force for permeation through a membrane based on optimal use of purge gas on the permeate side of the membrane. Such driving force for permeation is the difference in the partial pressures of the feed gas on the high pressure feed, or non-permeate side, and the low pressure permeate side of the membrane. Permeation through the membrane ceases when these partial pressures become equal. If the mole fraction concentration of water is $Yhi$ in a wet feed stream at high pressure, $Phi$, the maximum concentration, $Ylo$, of water in the permeate stream at low pressure, $Plo$, is:

$$Ylo = (Phi/Plo)Yhi \qquad (1)$$

If the feed flow rate of the gas being dried is $Ff$, then, for complete removal of water therefrom, a mass balance for the membrane system requires that the waste stream flow, $Fw$, be:

$$Fw = (Yhi/Ylo)Ff \geq (Plo/Phi)Ff \qquad (2)$$

This flow must come from either dry gases permeated by the membrane or from a dry purge stream. For membranes that advantageously have a very high separation factor for water relative to nitrogen, for example, the amount of nitrogen that will be permeated is insufficient to provide the waste stream flow required by equation (2). In the limiting case of no product permeation, all of the waste flow would come from the purge stream, $Fp$.

Thus, the purge-to-feed ratio for complete impurity removal is as follows:

$$Fp/Ff \geq Plo/Phi \qquad (3)$$

The effects of pressure and flow can be combined so as to define a "cleaning ratio", as follows:

$$CR = FpPhi/FfPlo = (Fp/Ff)(Phi/Plo) \qquad (4)$$

In theory, complete drying can be achieved only when CR is unity or larger. It will be appreciated, however, that circumstances may exist where only partial drying is needed, and a smaller cleaning ratio can be employed. Conversely, for thorough drying, a cleaning ratio considerably larger than one may be employed. Thus, a cleaning ratio of unity represents only the limiting requirement for complete impurity removal. Many other factors are pertinent in the design of practical processes and systems, and a cleaning ratio of 2 or larger is typically employed for essentially complete drying. It should be understood that there is a "trade-off" to be considered between the amount of purge gas employed, above the limiting requirement, and the surface area of the membrane employed. Thus, a large surface area is needed when the driving forces become too low for efficient permeation. The surface area can be decreased, on the other hand, if the amount of purge gas employed is increased and the cleaning ratio is substantially greater than one.

When a portion of the desired product gas is used for purge purposes, the product gas actually delivered from the system is the amount of retentate, $Fr$, which is given by:

$$Fr = Ff - Fp \qquad (5)$$

In order for a high product recovery to be achieved, the purge stream, $Fp$, must be small. From equations (3) and (4), it will be seen that this requires a high pressure ratio, i.e. $Phi/Plo$. In a typical drying application, the waste stream on the permeate side of the membrane is withdrawn from the membrane at slightly above atmospheric pressure, e.g. 15 psia, and the feed stream may be passed to the membrane system at about 150 psia, for a pressure ratio of 10:1. For complete drying, at least about 10%, and typically 15% or more, of the desired product gas must be recycled as purge gas and thus lost as part of the permeate side waste stream from the system, thereby reducing the product recovery of the system.

It has now been discovered that product recovery and process energy efficiency can be economically increased by carrying out the drying operation using purge under relatively deep vacuum conditions on the permeate side of the membrane. By employing subatmospheric pressure conditions for $Plo$, it is possible to attain very high pressure ratios and, thereby to reduce the purge flow to a very small portion of the product flow on the non-permeate side of the membrane.

While the purge flow may be reduced and the cleaning ratio increased by increasing the pressure ratio $Phi/Plo$, it is common practice in the art to limit the minimum value of $Plo$ to slightly above atmospheric pressure, so that the waste gas may conveniently be discharged from the membrane drying system to the ambient air and to avoid the cost and power expenditure of a vacuum pump. Under such circumstances, the pressure ratio can be increased only by raising the high pressure, Phi, level. However, this requires additional feed compression, and produces dry product at a pressure that may be higher than that required for the intended use.

The use of the vacuum conditions of the invention on the permeate side of the membrane is contrary to the conventional practice of the art. For most drying applications, a pressurized product stream is required, and, therefore, a compressor is needed to pressurize the feed stream to a desired superatmospheric pressure level. If the permeate side of the membrane is operated below atmospheric pressure, an additional vacuum pump must also be employed. Thus, two costly machines are required for such a transatmospheric process, while a single compressor suffices for a superatmospheric process. Therefore, it was believed in the art that the operating power requirements would necessarily be higher for such a transatmospheric process operation. Furthermore, for comparable pressure ratios, vacuum pumps are commonly more costly than compressors and operate at lower efficiencies. For these reasons, it has not been considered worthwhile to operate a transatmospheric drying process with a shallow vacuum, such as about 10 psia or greater, to increase the membrane pressure ratio, but instead to employ the conventional superatmospheric pressure conditions.

It has been found, however, that improvements in overall drying efficiency can be obtained by employing fairly low vacuum levels for the low pressure permeate side of the membrane. Feed gas pressure is at or above atmospheric pressure, e.g. up to about 170 psia or above. By thus reducing Plo while employing typical Phi conditions, the Phi/Plo pressure ratio can be greatly increased, thereby enabling the purge flow to be reduced, while maintaining a desired cleaning ratio level. When product gas is used for purge purposes, such a reduction in purge flow results directly in an improved product recovery. Even more importantly, it has been discovered that less feed gas flow is required, under such conditions to provide the same quantity of dry product gas. This reduction in the feed flow reduces the energy required for feed compression. Under desirable conditions, the reduced compression energy will more than compensate for the energy requirements of the vacuum pump employed in the practice of the invention.

The vacuum conditions of the invention have been found to be generally in the range of from about 0.1 to about 7.5 psia, with a range of from about 0.5 to about 5 psia being preferred, and a range of from about 1 to about 4 psia being most preferred for particular embodiments of the invention. While vacuum levels of about 10 psia or greater were indicated above as being undesirable vis-a-vis conventional superatmospheric conditions because of the cost and efficiency considerations relating to the use of vacuum pumps at such vacuum levels, it has also been found that subatmospheric pressure from levels of about 10 psia to about 13 psia may be used in the practice of the invention if such subatmospheric pressure levels can be generated without the requirement of incorporating a vacuum pump into the system. Thus, the purge exit line of the membrane system can be connected to the suction of a suitable existing compressor, for example, the feed gas compressor of the membrane system, or a third stage membrane permeate recycle compressor, or venturi means or the like can be used to provide such suction.

With reference to FIG. 1 of the drawings, wet feed gas to be dried is introduced through line 1 to compressor 2, wherein the feed gas pressure is elevated to the desired upper membrane pressure Phi. In most cases, this compression will result in condensation of some of the water present in compressor discharge 3. Further reduction in the water vapor content of the feed gas can be achieved by reducing the temperature of this stream in a chiller aftercooler 4. The condensed moisture is then removed from the feed gas stream in knock-out phase separator 5. The resulting saturated feed gas stream is then passed through line 6 to the high pressure side 7 of membrane separation module 8. Due to the high water selectivity of the membrane used for drying, most of the water vapor will selectively permeate through the membrane to the low pressure permeate side 9 of the membrane. The thus dried non-permeate gas is passed from membrane 8 through line 10. In many typical applications, some of this dry gas is expanded through valve 11 to subatmospheric pressure and is passed through line 12 to serve as purge gas for the low pressure side of membrane 8. The remaining dry gas passes through line 13 as the desired dry product gas of the process. The purge gas, as illustrated in FIG. 1, flows, countercurrent to the feed stream, through the low pressure, permeate side 9 of membrane 8 where it serves to sweep the permeated gases, including said water vapor, from membrane 8 through line 14 to vacuum pump 15, from which it is discharged through line 16 as waste, or, if desired, passed for use in an auxiliary process.

In an alternative embodiment, where an external source of dry gas is available for use as purge gas, valve 11 can be closed, or omitted, and the dry external purge gas can be passed through line 17 and line 12 to serve as the desired purge stream in membrane 8. In this case, the entire non-permeate or retentate stream removed from membrane 8 through line 10 can be recovered through line 13 as dry product gas.

In those applications wherein the drying process is an adjunct to another process, such as the production of nitrogen from air, the feed gas stream may be available at high pressure, and feed compressor 2, chiller 4 and phase separator 5 may not be required as elements of the drying process, although functionally present in other parts of an overall separation process of which the subject drying process and system are a part.

Figure 2:
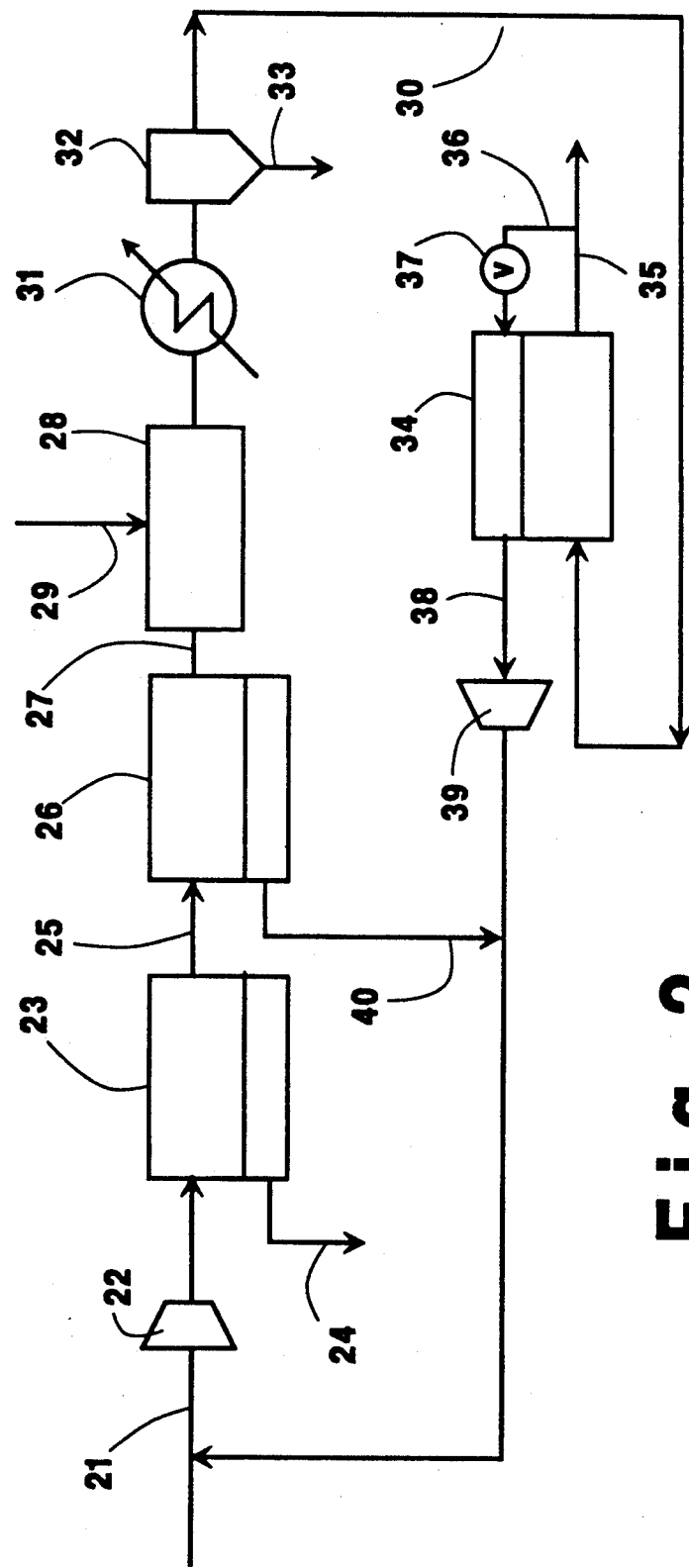
FIG. 2 is a schematic flow diagram for the drying of high purity nitrogen produced in a membrane-deoxo system, using a small portion of the dry nitrogen product as purge gas.

In the embodiment of the invention illustrated in FIG. 2 of the drawings, feed air is separated in a two-stage membrane system to produce a partially purified nitrogen stream that is subject to deoxo treatment to remove residual oxygen therefrom latter is dried in a membrane dryer to produce dry, high purity nitrogen product. Thus, feed air in line 21 passes through compressor 22 to first stage membrane 23 from which an oxygen-containing permeate waste stream is separated through line 24. The non-permeate gas therefrom passes in line 25 to second stage membrane 26 from which the partially purified nitrogen stream passes in line 27 to deoxo system 28. Hydrogen is introduced to deoxo system 28 through line 29 for catalytic reaction with residual oxygen so that a wet, high purity nitrogen stream is removed therefrom in line 30 containing chiller 31 and phase separator 32 from which condensed water is removed through line 33. The saturated high purity nitrogen stream in line 30 is then more fully dried by passage to membrane dryer 34 from which dry, high purity nitrogen product is withdrawn through line 35.

In this embodiment, a small portion of said dry, high purity nitrogen product is recycled to membrane dryer 34 through line 36 containing valve 37 for passage therethrough as dry purge in countercurrent flow to the nitrogen gas flow on the feed or non-permeate side of the membrane. The purge effluent is discharged from membrane dryer 34 through line 38 containing vacuum pump 39 for recycle to line 21 for compression and passage to the two-stage membrane system for recovering of additional quantities of nitrogen product. The permeate gas from second membrane stage 26 is also desirably passed in line 40 to line 38 for return to the system.

The advantageous features of the invention, in which the transatmospheric drying conditions herein described and claimed are employed, will be further appreciated from the following illustrative examples. In such examples, a membrane dryer stream adapted for the use of purge on the permeate side is employed, said membrane dryer thus being of 4-port design, having feed entry, non-permeate exit, permeate exit and purge entry ports. The membrane dryer in each case is a hollow-fiber membrane adapted for countercurrent flow on the permeate and non-permeate sides. The membrane has a permeability/thickness ratio on the order of $6.33 \times 10^6$ Barrer/cm. and a separation factor of water, relative to oxygen, of 1,000. Such values are characteristic of readily achievable state-of-the-art membrane technology. In examples 1 and 2 below, the membrane area is set at 150 square feet, and the product flow rate is 1,000 NCFH, with a dewpoint of $-40°$ F. at pressure. The feed nitrogen to be dried has been produced by an air separation process that removes essentially all of the oxygen, but leaves the nitrogen saturated with water vapor as in the FIG. 2 embodiment. In said examples 1 and 2, the feed nitrogen stream is available at 150 psig (165 psia), 100° F. and contains about 5,766 ppm of water vapor.

EXAMPLE 1

In this example, the purge ratio, compressor power, vacuum pump power, total power and the product recovery have been determined for various levels of the low, permeate side pressure, Plo, including values at and below atmospheric. For such purposes, two-stage compressor and vacuum pump units having adiabatic stage efficiencies of 80% and 60%, respectively, are used. The results are as shown in Table I:

TABLE 1

| Parameter | Standard Process | Vacuum Processes | | |
|---|---|---|---|---|
| Phi (psia) | 165 | 165 | 165 | 165 |
| Plo (psia) | 15 | 10 | 5 | 2 |
| Phi/Plo | 11 | 16.5 | 33 | 82.5 |
| Purge Ratio % | 20.4 | 13.5 | 6.6 | 2.57 |
| Cleaning ratio | 2.24 | 2.23 | 2.19 | 2.12 |
| Incremental Compressor Power (W) | 930 | 560 | 260 | 100 |
| Vacuum Pump Power (W) | 0 | 90 | 130 | 100 |
| Total Power (W) for Drying | 930 | 650 | 390 | 200 |
| Product Recovery % | 83 | 88 | 94 | 97.5 |

It will be seen that, as the level of vacuum deepens, i.e. with lower values of Plo, the non-permeate/permeate pressure ratio, Phi/Plo, increases and the amount of purge gas required, as a % of the feed gas, become significantly smaller. Since less of the desired product gas is required for use as purge gas, product recovery is appreciably increased. In addition, it will be noted that, surprisingly and unexpectedly, the practice of the invention enables the incremental compression power requirements to be very significantly decreased as the vacuum condition on the permeable side of the membrane are deepened. When the required power to operate the vacuum pump employed for purposes of the invention is added thereto, it is found, surprisingly and unexpectedly, that the total power requirements for such vacuum purge drying decrease substantially as the permeate side pressure is decreased, in the example, down to 2 psia. Those skilled in the art will appreciate that, as part of an overall evaluation of the benefits of the invention vis-a-vis conventional practice, the cost of the vacuum pump and the added complexity thereof, must be considered with respect to the overall technical and economic feasibility of employing the invention in practical commercial operation. When such cost is considered, it is found that the use of shallow vacuum levels are not attractive alternatives to conventional practice. When Plo is reduced to about 0.1 to about 7.5 psia range, and the preferred vacuum ranges indicated above, however, the surprisingly reduced operation power requirements are found to more than compensate for the additional cost of employing a vacuum pump. Thus, the practice of the invention at such deep vacuum conditions enables the important gas drying operation to be carried out with enhanced drying efficiency.

The results of Table I would appear to indicate that the lower Plo becomes, the greater the overall efficiency that can be obtained in the vacuum purge operation of the invention. The range of vacuum pressures suitable for purposes of the invention, however, is generally from about 0.1 to about 7.5 psia or up to about 10 psia if the vacuum is generated without requiring the use of a vacuum pump, as disclosed above. If the pressure ratio Phi/Plo were to be increased beyond about 100, the amount of purge gas employed could be further reduced, but the resulting increase in product recovery would not be substantial. Furthermore, it is desirable to have more than a negligible quantity of purge gas present at the product end of the membrane dryer. Table I shows that the cleaning ratio remains near 2 for the cases tested. The minimum Plo that is conveniently achieved is also limited by the vapor pressure of the water, which is nearly 1 psia at 100° F. Furthermore, relatively simple vacuum pumps can be used to achieve the vacuum pressure levels indicated, while more elaborate and costly vacuum pumps would be required to achieve lower vacuum levels.

EXAMPLE 2

This example is similar to that of Example 1, but an external source of dry air is employed for purge purposes, with the other conditions remaining the same as in Example 1.

TABLE II

| Parameter | Standard Process | Vacuum Process |
|---|---|---|
| Phi (psia) | 165 | 165 |
| Plo (psia) | 15 | 2 |
| Phi/Plo | 11 | 82.5 |
| Purge Ratio % | 20.4 | 2.57 |
| Cleaning Ratio | 2.24 | 2.12 |
| Vacuum Pump Power (W) | 0 | 100 |

TABLE II-continued

| Parameter | Standard Process | Vacuum Process |
|---|---|---|
| O$_2$ Conc. (ppm) by back perm. | 196 | 26 |

In this example, it will be appreciated that there is no loss of product because of diversion for use as purge gas, and there is no reduction in the compressor energy requirements when vacuum purge is employed. The vacuum process of the invention requires additional energy expenditure because of the vacuum purging operation, and must also accommodate the additional capital cost of the vacuum pump. In addition, there is an unavoidable back permeation of some oxygen from the external air into the product stream when said external air, rather than recycled, high purity product gas, is employed as purge gas. An advantage of the vacuum purge process of the invention, as shown by the results recited in Table II, is that the amount of back permeation is greatly reduced under the vacuum conditions of the invention. This feature may be required to meet the product purity specifications of particular applications. Furthermore, while it is commonly assumed that a dry air stream is available at no cost and in the quantity required for vacuum purge operations, the actual cost of the dry air stream for use as purge may not be a negligible item in practical commercial operations. It is important to note, therefore, that the vacuum purge process of the invention utilizes only 13% of the dry air requirements of conventional practice using purge air available at about atmospheric pressure.

If the amount of oxygen back permeation, i.e. 26 ppm in the Example 2 embodiment of the invention, is still more than is allowed by applicable product specifications, then either product purging must be employed, as in Example 1, or much lower levels of vacuum would be needed if membrane drying operations are to be employed. As suggested above, the costs associated with such very deep levels of vacuum may make such an approach infeasible from a practical operating viewpoint.

EXAMPLE 3

This example pertains to the production of dry air from the ambient atmosphere in a stand-alone process employing product purging. The membrane characteristics and the compressor and vacuum pump efficiencies are the same as those pertaining in Examples 1 and 2 above. The production requirement of this example is dry air product at a flow rate of 1,000 NCFH at 40 psia (25 psig). The product dew point is −40° F., which is equivalent to 127 ppm. The membrane surface area available is 550 sq. ft., and the feed air is saturated with water at 100° F. at the feed pressure specified.

TABLE III

| Parameter | Case A Lo Pressure Superatmos. | Case B Hi Pressure Superatmos. | Case C Vacuum Transatmos. |
|---|---|---|---|
| Feed H$_2$O (ppm) | 23740 | 6330 | 23740 |
| Feed Pressure Phi (psia) | 40 | 150 | 40 |
| Plo (psia) | 15 | 15 | 4 |
| Phi/Plo | 2.67 | 10 | 10 |
| Purge Ratio % | 85 | 10 | 20 |
| Cleaning Ratio | 2.27 | 1 | 2 |
| Total Compressor Power (kW) | 7.80 | 3.33 | 1.46 |
| Vacuum Pump Power (kW) | 0 | 0 | 0.57 |
| Total Power (kW) | 7.80 | 3.33 | 2.03 |

In Case A, the feed gas is elevated to the pressure required for the product specifications, and the waste is discharged at atmospheric pressure. This constitutes a simple processing operation, but it uses a high purge ratio relative to feed air flow and has a high feed compressor energy requirement. In case B, this compressor energy is reduced by increasing the feed gas pressure to 10 atmospheres (150 psi). The dry area product is also delivered at this pressure, which is higher than that required and, therefore, contains excess unused energy. In this case, the allocated membrane surface area will permeate all of the moisture required to be removed, even when the cleaning ratio is reduced to a nominal value of one. In practice, it would likely be desirable to employ a smaller membrane area and a higher cleaning ratio under such circumstances.

Case C represents a desirable embodiment of the transatmospheric process of the invention, wherein the feed gas is compressed to the pressure required for the non-permeate, dry product gas, and the low pressure, permeate side of the membrane is under vacuum at a pressure of 4 psia. Even though this process requires energy for both compression and vacuum pumping, it will be appreciated that it is more energy efficient than either Case A or Case B. Furthermore, the increased energy efficiency is sufficient to justify the additional cost of the vacuum pump required for the vacuum pumping operation of the invention.

It will be appreciated that the membrane composition used in the membrane dryer of the invention should, as indicated above, be one having a high selectivity for water over the gas being dried, i.e. nitrogen and oxygen in air drying. That is moisture must be permeated much more rapidly than air or other gas being dried. For example, the water/air separation factor should be at least 50, preferably greater than 1,000, for advantageous moisture removal from feed air. In addition, the membrane composition should have a relatively low permeability rate for the gas being dried, e.g. for both nitrogen and oxygen in air drying applications. Cellulose acetate is an example of a membrane material satisfying such criteria. A variety of other membrane materials can also be employed, such as ethyl cellulose, polyurethane, polyamide, polystyrene and the like.

While various membrane configurations can be employed in the practice of the invention, e.g. spiral wound membranes, hollow fiber membrane configurations are particularly desirable because of the enhanced surface area and packing density provided thereby. In preferred embodiments of the invention using hollow fiber bundles, the passage of the feed air or other gas being dried may be inside-out, wherein the feed gas is passed through the bores of the hollow fibers, or outside-in, wherein the feed gas is passed to the outer or shell side of the membrane bundles with permeate gas being recovered from within the bores of the hollow fibers. As shown in European Patent Application Publication No. 0,226,431 published Jun. 24, 1987, countercurrent flow patterns can be created by encasing the hollow fiber bundle with an impervious barrier over its longitudinal outer surface except for a non-encased circumferential region conveniently located near one end of the bundle. This or other such means serve to enable the feed gas or permeate gas, depending on the desired manner of operation, i.e. inside-out or outside-in to pass in countercurrent flow outside the hollow fibers parallel to the flow direction of permeate gas or feed gas in the bores of the hollow fibers. The feed gas on the outside of the hollow fiber bundle, for example, is caused to flow parallel to, rather than at right angle to, the central axis of the fiber bundle. It will be understood that the membrane fibers may be organized either in straight assemblies parallel to the central axis of the bundle, or alternatively, and preferably, can be wound in helical fashion around the central axis. In any event, the impermeable barrier may be a wrap of impervious film, e.g. polyvinylidene or the like. Alternatively, the impermeable barrier may be an impervious coating material, e.g. polysiloxane, applied from an innocuous solvent, or a shrink sleeve installed over the membrane bundle and shrunk onto said bundle. The impermeable barrier thus encases the hollow fiber or other membrane bundle and, as disclosed in said publication, has an opening therein permitting the flow of gas into or from the bundle so that the fluid flows in a direction substantially parallel to the axis of the fiber bundle. For purposes of the invention, the flow pattern should be one of countercurrent flow of the wet feed air or other gas stream relative to the permeate gas comprising purge gas supplied as indicated above, together with the moisture that permeates through the membrane material.

For purposes of the invention, asymmetric or composite membranes are preferred because of their very thin membrane separation regions or layers supported by more porous substrates for mechanical strength and support. Dense fiber membranes can also be used, although they have very low permeability rates because of the inherently greater separation region thickness thereof.

While the invention has been described above particularly with respect to the highly desirable gas drying application thereof, it will be understood that the invention can also be practiced with respect to other commercially important gas separations. Thus, the invention can be used for applications in which it is desired to remove fast permeating components, other than water, from a feed gas stream, e.g. $CO_2$ and ammonia cleanup from process gas streams. In addition, the invention is of significance for air separation applications for the recovery of nitrogen product gas, particularly where the membrane systems employed, e.g. facilitated transport membranes, exhibit an enhanced permeability of the oxygen component of feed air.

It is within the scope of the invention, therefore, to separate fast permeating components, such as said $CO_2$, ammonia and oxygen, from feed gas streams, apart from the highly desirable gas drying applications of the invention disclosed above.

It will be appreciated from the above that the invention represents a significant advance in the membrane separation art. Thus, the invention enables highly efficient drying and other gas separation operations to be carried out using desirably small amounts of purge gas, with low overall energy requirements.

I claim:

1. An improved membrane gas separation process comprising:
   (a) passing a feed gas stream to the non-permeate side of a membrane system adapted for the passage of purge gas on the permeate side thereof, and for the passage of the feed gas stream in a countercurrent flow pattern relative to the flow of purge gas on the permeate side thereof, said membrane system being capable of selectively permeating a fast permeating component from said feed gas, at a feed gas pressure at or above atmospheric pressure;
   (b) passing purge gas to the permeate side of the membrane system in countercurrent flow to the flow of said feed gas stream in order to facilitate carrying away of said fast permeating component from the surface of the membrane and maintaining the driving force for removal of the fast permeating component through the membrane from the feed gas stream, said permeate side of the membrane being maintained at a subatmospheric pressure within the range of from about 0.1 to about 5 psia by vacuum pump means;
   (c) recovering a product gas stream from the non-permeate side of the membrane; and
   (d) discharging purge gas and the fast permeating component that has permeated the membrane from the permeate side of the membrane, whereby the vacuum conditions maintained on the permeate side of the membrane by said vacuum pump means enhance the efficiency of the gas separation operation, thereby reducing the overall energy requirements thereof.

2. The process of claim 1 in which said permeate side pressure is from about 0.5 to about 5.0 psia.

3. The process of claim 2 in which said permeate side pressure is from about 1 to about 4 psia.

4. The process of claim 1 in which said feed gas comprises moisture-laden air and the product gas comprises dry air.

5. The process of claim 4 in which the purge gas comprises a portion of the dry product gas stream recovered from the membrane.

6. The process of claim 1 in which the purge gas comprises a portion of the product gas stream recovered from the membrane.

7. The process of claim 1 in which said feed gas pressure is from about atmospheric pressure to about 170 psia.

8. The process of claim 1 in which said feed gas stream comprises air, and said product gas comprises nitrogen.

9. An improved membrane gas separation process comprising:
   (a) passing a feed gas stream to the non-permeate side of a membrane system capable of selectively permeating a fast permeating component from said feed gas, at a feed gas pressure at or above atmospheric pressure said membrane system being adapted for the passage of purge gas on the permeate side thereof, and for the passage of the feed gas stream in a countercurrent flow pattern relative to the flow of purge gas on the permeate side thereof;
   (b) passing purge gas to the permeate side of the membrane system in countercurrent flow to the flow of said feed gas stream in order to facilitate carrying away of said fast permeating component from the surface of the membrane and maintaining the driving force for removal of the fast permeating component through the membrane from the feed gas stream, said permeate side of the membrane being maintained at a subatmospheric pressure within the range of from about 10 to about 13 psia without the use of vacuum pump means;

(c) recovering a product gas stream from the non-permeate side of the membrane; and (d) discharging purge gas and the fast permeating component that has permeated the membrane from the permeate side of the membrane, whereby the vacuum conditions maintained on the permeate side of the membrane without the use of vacuum pump means enhance the efficiency of the gas separation operation, thereby reducing the overall energy requirements thereof.

10. The process of claim 9 in which said feed gas comprises moisture-laden air and the product gas comprises dry air.

11. The process of claim 10 in which the purge gas comprises a portion of product gas stream recovered from the membrane.

12. The process of claim 9 in which the purge gas comprises a portion of the product gas stream recovered from the membrane.

13. The process of claim 9 in which said feed gas pressure is from about atmospheric pressure to about 170 psia.

14. The process of claim 9 in which said feed gas stream comprises air, and said product gas comprises nitrogen.

15. An improved membrane gas separation system comprising:

(a) a permeable membrane capable of selectively permeating a fast permeating component from a feed gas stream, the membrane being adapted for the passage of purge gas on the permeate side thereof, and for the passage of the feed gas stream in a countercurrent flow pattern relative to the flow of purge gas on the permeable side thereof;

(b) conduit means for passing a feed gas stream to the non-permeate side of the membrane at a feed gas pressure at or above atmospheric pressure;

(c) conduit means for passing purge gas to the permeate side of the membrane in countercurrent flow to the flow of said feed gas stream;

(d) vacuum pump means for maintaining a subatmospheric pressure on the permeate side of the membrane within the range of from about 0.1 to 5 psia;

(e) conduit means for recovering product gas from the non-permeate side of the membrane; and (f) conduit means for discharging purge gas and said fast permeating component that has permeated the membrane from the permeate side of the membrane, whereby the vacuum conditions maintained on the permeate side of the membrane by said vacuum pump means enhance the efficiency of the gas separation operation, thereby reducing the overall energy requirements thereof.

16. The system of claim 15 in which said vacuum pump means for maintaining a subatmospheric pressure comprises vacuum pump means capable of maintaining a permeate side subatmospheric pressure of from about 0.5 to about 5.0 psia.

17. The system of claim 16 in which said vacuum pump means is capable of maintaining a subatmospheric pressure of from about 1 to about 4 psia.

18. The system of claim 15 and including conduit means for diverting a portion of the recovered product gas for use as said purge gas.

19. The system of claim 15 and including gas compressor means for compressing the feed gas stream to a desired feed gas pressure.

20. The system of claim 19 in which said gas compressor means is capable of compressing the feed gas to a pressure up to about 170 psia.

21. An improved membrane gas separation system comprising:

(a) a permeate membrane capable of selectively permeating a fast permeating component from a feed gas stream, the membrane being adapted for the passage of purge gas on the permeate side thereof, and for the passage of the feed gas stream in a countercurrent flow pattern relative to the flow of purge gas on the permeate side thereof;

(b) conduit means for passing a feed gas stream to the non-permeate side of the membrane at a feed gas pressure at or above atmospheric pressure;

(c) conduit means for passing purge gas to the permeate side of the membrane in countercurrent flow to the flow of said feed gas stream;

(d) means for maintaining a subatmospheric pressure on the permeate side of the membrane within the range of from about 10 to 13 psia without employing vacuum pump means;

(e) conduit means for recovering product gas from the non-permeate side of the membrane; and (f) conduit means for discharging purge gas and said fast permeating component that has permeated the membrane from the permeate side of the membrane, whereby the vacuum conditions maintained on the permeate side of the membrane without use of vacuum pump means enhance the efficiency of the gas separation operation, thereby reducing the overall energy requirements thereof.

22. The system of claim 21 and including conduit means for diverting a portion of the recovered product gas for use as said purge gas.

23. The system of claim 21 and including gas compressor means for compressing the feed gas stream to a desired feed gas pressure.

24. The system of claim 23 in which said gas compressor means is capable of compressing the feed gas to a pressure up to about 170 psia.

25. The system of claim 23 in which said means for maintaining a subatmopheric pressure on the permeate side of the membrane comprises means for connecting said conduit means for discharging purge gas and said fast permeating component to the suction of said gas compressor means.

* * * * *